(12) United States Patent
Lok

(10) Patent No.: US 9,980,611 B2
(45) Date of Patent: May 29, 2018

(54) MULTI-FUNCTIONAL LADLE

(71) Applicant: PROLIFIC INTERNATIONAL LIMITED, Hong Kong (CN)

(72) Inventor: Hau Yi Lok, Shatin (HK)

(73) Assignee: Prolific International Ltd., Fotan, Shatin (HK)

( * ) Notice: Subject to any disclaimer, the term of this patent is extended or adjusted under 35 U.S.C. 154(b) by 219 days.

(21) Appl. No.: 14/763,782

(22) PCT Filed: Mar. 3, 2015

(86) PCT No.: PCT/CN2015/073528
§ 371 (c)(1),
(2) Date: Jul. 27, 2015

(87) PCT Pub. No.: WO2015/135428
PCT Pub. Date: Sep. 17, 2015

(65) Prior Publication Data
US 2016/0270603 A1    Sep. 22, 2016

(30) Foreign Application Priority Data

Mar. 10, 2014   (HK) .................................. 14102339.0

(51) Int. Cl.
*A47J 43/28*  (2006.01)
*A47G 21/04* (2006.01)
*A47G 21/00* (2006.01)

(52) U.S. Cl.
CPC ............ *A47J 43/288* (2013.01); *A47G 21/04* (2013.01); *A47J 43/28* (2013.01); *A47J 43/281* (2013.01); *A47G 2021/002* (2013.01)

(58) Field of Classification Search
CPC ........ A47J 43/288; A47J 43/283; A47J 43/28; A47J 43/281; A47G 21/06; A47G 21/04; A47G 2021/002
See application file for complete search history.

(56) References Cited

U.S. PATENT DOCUMENTS

| | | | | |
|---|---|---|---|---|
| 3,828,999 | A | * | 8/1974 | Humphrey ............. A47G 21/04 229/401 |
| 2007/0084064 | A1 | * | 4/2007 | Fite, IV .................. A47G 19/02 30/324 |

(Continued)

FOREIGN PATENT DOCUMENTS

| CN | 202312633 U | 7/2012 |
|---|---|---|
| CN | 202775995 U | 3/2013 |

*Primary Examiner* — Robert Scruggs
(74) *Attorney, Agent, or Firm* — Muncy, Geissler, Olds & Lowe, P.C.

(57) ABSTRACT

The invention relates to a multi-functional ladle, which comprises a head made of a soft material, and a handle made of a hard material which comprises a first folding portion and is connected with the head; wherein the head comprises a connecting portion to connect the head and the handle. The connecting portion comprises a second folding portion and a third folding portion, by which the multi-functional ladle can be configured to be a spatula or a ladle. The multi-functional ladle of the invention is ingeniously designed by utilizing the property of the material itself so that the ladle can be easily turned to a spatula or the spatula can be easily turned to a ladle. Therefore the multi-functional ladle can be configured into a tool with two functions.

8 Claims, 8 Drawing Sheets

(56) References Cited

U.S. PATENT DOCUMENTS

| | | | |
|---|---|---|---|
| 2009/0205209 A1 | 8/2009 | Tovar | |
| 2009/0307912 A1* | 12/2009 | Chapman | A47J 43/281 30/327 |
| 2014/0190022 A1* | 7/2014 | Siren | A47J 43/281 30/324 |
| 2015/0182052 A1* | 7/2015 | Stewart-Stand | A47G 21/02 30/147 |

* cited by examiner

MULTI-FUNCTIONAL LADLE

TECHNICAL FIELD OF THE INVENTION

The invention relates to a camping appliance, and in particular, to a multi-functional ladle that can be carried while camping, and can be configured into a ladle or spatula through a structure thereof, thus facilitating carrying.

BACKGROUND OF THE INVENTION

Camping has become a hot leisure way for people. Usually, a camper needs to cook food by himself (herself) outdoors. Therefore, a normal metal ladle or spatula becomes a necessity. In this case, the camper needs to carry various tools, which occupies the volume of a knapsack, increases the weight, and is also inconvenient to carry.

With respect to the foregoing defects, those skilled in the art have also tried to improve, and invented some tools with two functions. For example, Chinese patent 202312633 U discloses a ladle with a spatula which includes a spatula includes a grip handle, a spatula head, and a ladle head, wherein the two ends of the grip handle are respectively connected with the spatula head and the ladle head in a threaded manner. Preferably, the grip handle is provided with a recess for convenient holding. The ladle with a spatula can either be used as a spatula, or served as a ladle, is convenient to carry, and saves the space; moreover, the ladle with a spatula is simple in structure. Such a design is to respectively set the ladle and the spatula at the two ends of the grip handle, but does not solve the fore-mentioned technical problem radically.

Therefore, it is necessary to further improve the prior art via preparing a light multifunctional appliance for camping which may realize mutual transformation between a ladle and a spatula through a folding manner on the aspect of structure based on the existing technical conditions.

SUMMARY OF THE INVENTION

The object of the invention is to provide a novel foldable multi-functional ladle which can overcome the foregoing inherent problems of the prior art, realize mutual transformation between the ladle and the spatula, is entirely easy to carry and convenient to use, and is also clean and sanitary.

To realize the foregoing objects, the invention employs a technical solution as follows.

A multi-functional ladle includes:
a head made of a soft material;
a handle made of a hard material, which comprises a first folding portion and is connected with the head;
wherein the head includes a connecting portion to connect the head and the handle. The connecting portion includes a second folding portion and a third folding portion, by which the multi-functional ladle can be configured to be a spatula or a ladle.

According to one embodiment of the multi-functional ladle of the invention, the second folding portion is "V"-shaped, wherein the bottom of the "V"-shaped folding portion the third folding portion are configured to form an intersection point.

According to one embodiment of the multi-functional ladle, the "V"-shaped folding portion comprises one or more first folding slots and one or more second folding slots, wherein the sizes of the first folding slot and the second folding slot are different. In one embodiment, the first folding slot is deeper, while the second folding slot is shallower.

Further, according to one embodiment of the multi-functional ladle, the maximum sizes of the first folding slot are 4.6 mm in depth and 5 mm in width; and the maximum sizes of the first folding slot are 1.4 mm in depth and 3 mm in width. According to one embodiment of the multi-functional ladle, the folding portion of the handle is "W"-shaped.

According to one embodiment of the multi-functional ladle, the middle of the "W"-shaped folding portion has a hollow part.

According to one embodiment of the multi-functional ladle, the handle includes two concave-convex buckles.

According to one embodiment of the multi-functional ladle, the head bends in an upswept manner and keeps a height of 30-60 mm from the ground surface.

According to one embodiment of the multi-functional ladle, the soft material is silicone. In another embodiment, the soft material is thermoplastic elastomer. The material is easy to fold, and complies with the state safety requirements on food at each level.

According to one embodiment of the multi-functional ladle, the hard material is polyamide (PA). The material needs to keep hardness, cannot be easily deformed, and complies with the safety requirements on food level. Moreover, the material needs to bear high temperature, cannot release harmful substances, and needs to be folded by hundred times.

According to the multi-functional ladle of the invention, the ladle can be conveniently and easily changed into the spatula, or the spatula can be conveniently and easily changed into the ladle utilizing the characteristics of the materials thereof and skillful design, which is convenient and practical.

According to the multi-functional ladle of the invention, the handle can be opened to form the spatula through the "V"-shaped folding portion of the connecting portion and the third folding portion as well as the match of the "W"-shaped first folding portion of the handle. Moreover, the handle can be folded into an arch, and the head can also be folded into an arch to form the ladle, so that the multi-functional ladle can be configured into a tool with two functions.

The invention has novel structure, is convenient and practical, and complies with the safety standards of such countries or regions as the USA, European and Germany or the like.

BRIEF DESCRIPTION OF THE DRAWINGS

To explain the specific structure of the invention clearly, the invention will be described in details hereinafter with reference to the drawings, wherein.

DETAILED DESCRIPTION OF THE INVENTION

The invention will be described in details hereinafter with reference to the drawings and specific embodiments. The schematic embodiments and explanations of the invention herein are only intended to explain the invention, and do not contribute any restriction of the invention.

Figure 1:
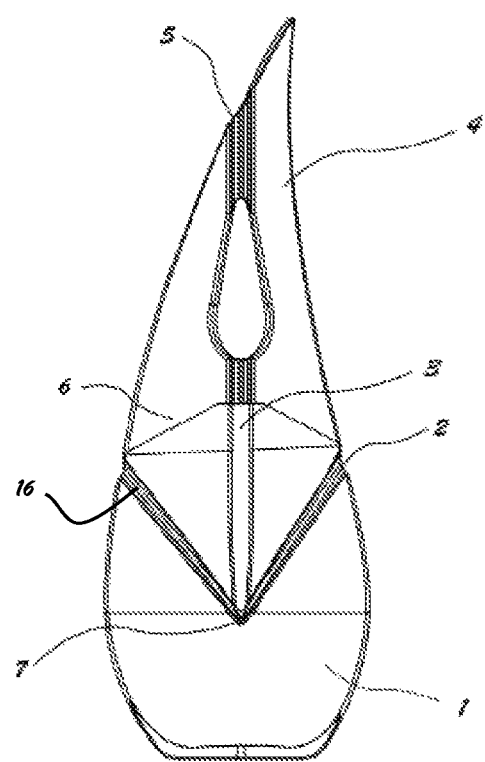
FIG. 1 is a block diagram showing an embodiment of a multi-functional ladle according to the invention, in which a shape of the multi-functional ladle served as a spatula is shown.
Figure 2:
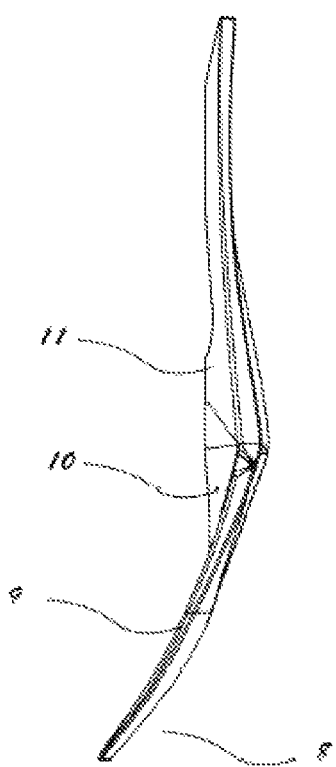
FIG. 2 is a lateral block diagram of FIG. 1.
Figure 3:
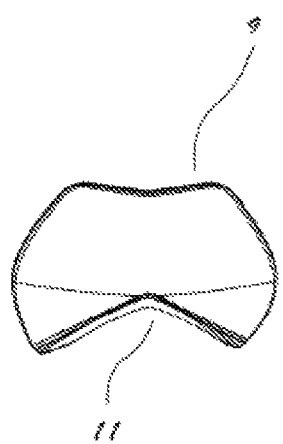
FIG. 3 is a block diagram showing a connecting portion of the multi-functional ladle according to the invention.
Figure 4:
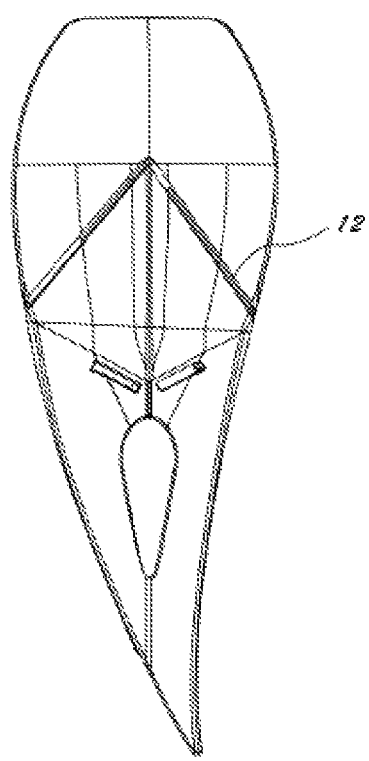
FIG. 4 is a block diagram of a rear view of FIG. 1.
Figure 8:
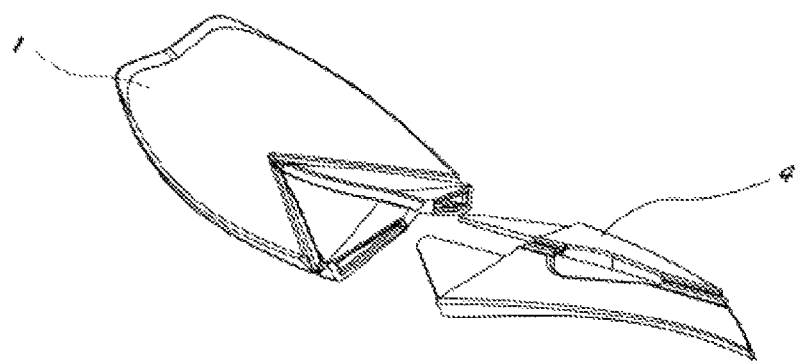
FIG. 8 is a block diagram showing a structure of the multi-functional ladle according to the invention.

Referring to FIG. 1 to FIG. 8, the multi-functional ladle of the invention includes a head 1 made of a soft material, and a handle 4 made of a hard material, which comprises a first folding portion 5 and is connected with the head, wherein the head 1 includes a connecting portion to connect the head 1 with the handle 4 (as shown in FIG. 8). As shown in FIG. 1, the head includes a second folding portion 16 and a third folding portion 3, by which the multi-functional ladle can be configured to be a spatula or a ladle via a manner of folding or unfolding the second folding portion 16 and the third folding portion 3 of the connecting portion.

In one embodiment, the soft material for making the head 1 is silicone. In another embodiment, the soft material for making the head 1 is thermoplastic elastomer. These materials are easy to fold, and comply with the state safety requirements on food level.

In another embodiment, the hard material for making the handle 4 is polyamide. The material needs to keep hardness, cannot be easily deformed, and complies with the safety requirements on food level. Moreover, the material also needs to bear high temperature, cannot release harmful substances, and can also be folded by hundred times.

The foregoing materials are only preferred materials; therefore, other materials complying with the requirements can also be selected. For example, the handle can be made of polystyrene that can be folded for hundred times and materials that can be heated.

Further, the second folding portion 16 is "V"-shaped, wherein the bottom of the "V"-shaped second folding portion 16 and the third folding portion 3 are configured to form an intersection point 7. The "V"-shaped second folding portion 16 includes one or more first folding slots 2 and one or more second folding slots 12 arranged before and after.

According to one embodiment of the multi-functional ladle of the invention, the "V"-shaped second folding portion 16 includes one or more first folding slots 2 and one or more second folding slots 12, wherein the sizes of the first folding slot 2 and the second folding slot 12 are different. In one embodiment, the first folding slot 2 is deeper, while the second folding slot 12 is shallower. Further, according to one embodiment of the invention, the maximum sizes of the more first folding slots are 4.6 mm in depth and 5 mm in width; and the maximum sizes of the more second folding slots 12 are 1.4 mm in depth and 3 mm in width.

According to one embodiment of the multi-functional ladle of the invention, the first folding portion 5 of the handle 4 is "W"-shaped. Further, the width of the first folding portion 5 is equivalent to the width of the third folding portion 3. After the head 1 is connected with the handle 4, the connecting portion is in a reversed "V" shape 6. Moreover, the head 1 bends in an upswept manner and keeps a height of 30-60 mm from the ground surface. As shown in FIG. 8, a preferred height from the ground surface is 50 mm.

According to one alternative embodiment of the multi-functional ladle of the invention, the middle of the "W"-shaped folding portion 5 is provided with a hollow part for facilitating being folded and being hung on a hook.

Figure 6:
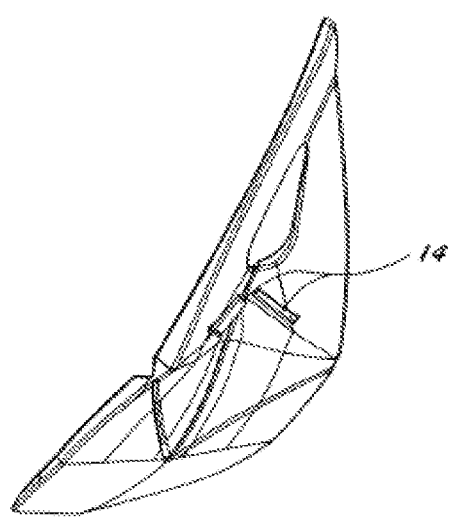
FIG. 6 is a block diagram showing another embodiment of the multi-functional ladle according to the invention.
Figure 7:
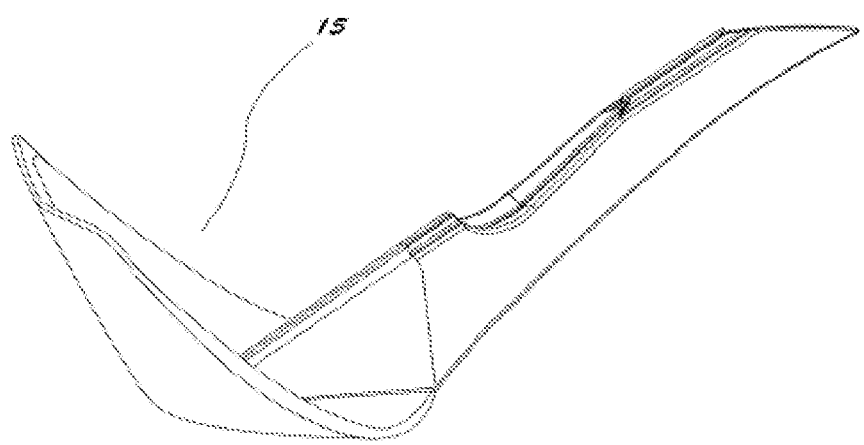
FIG. 7 is a stereoscopic block diagram showing folding the multi-functional ladle of the invention into a ladle.

Referring to FIG. 6, and according to one embodiment of the multi-functional ladle of the invention, the handle 4 includes two concave-convex buckles 14 so as to be capable of fixing the handle 4 after the handle 4 is folded.

Figure 5:
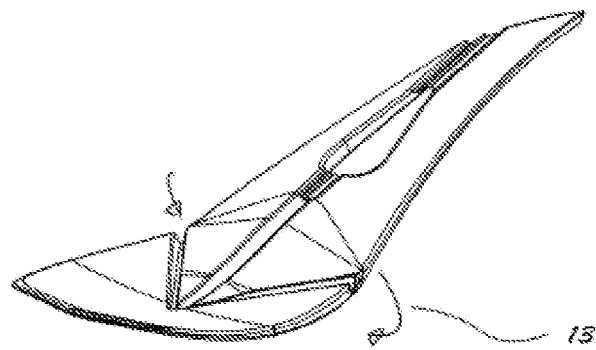
FIG. 5 is a block diagram showing a folding process of the multi-functional ladle according to the invention.

During actual application, the multi-functional ladle becomes a spatula when being placed flatly, i.e., the entire folding portion is placed flatly, which is as shown in 13 of FIG. 5. At this moment, since the sizes of the folding slots on the upper and lower sides of the "V"-shaped second folding portion 16 are different (the upper side is deeper and the lower side is shallower), and under the action of the arch 10 of the handle, food with a certain weight can be shoveled and not turned over towards the back when the multi-functional ladle is used as a spatula. Moreover, the hardness design of the silicone part is correspondingly adjusted as well for balancing the hardness of the multi-functional ladle when being used as a spatula and making the multi-functional ladle be easily bent into a ladle. Usually, the hardness of the silicone is 80 degrees.

When the multi-functional ladle needs to be used as a ladle, the "V"-shaped second folding portion is folded 16 internally. At this moment, the head 1 and the "V" shape of the connecting portion are upward. As shown in the Fig, the middle of the handle part is an arch, which is as shown in 10 of FIG. 2. the handle 4 matches with the head 1 to form an arch 11, and forms an included angle of 60-70 degrees with a vertical line, wherein a preferred included angle is 65 degrees. At this moment, after the "W"-shaped folding portion of the handle 4 is folded, the handle 4 and the connecting portion are in a reversed "V" shape. In this case, the handle 4 pulls the two sides of the head 1, and forces applied on the point of connection between the reversed "V"-shaped connecting portion and the two sides of the "V"-shaped connecting portions are larger, so as to press down the two sides of the "V"-shaped connecting portion. In addition, the first folding slot 2 and the second folding slot 12 form a pivot 7 with the third folding portion 3, and finally make the head 1 be folded upwards along the "V"-shaped second folding portion 16 to form a ladle shape. In order to reinforce the ladle, the concave-convex buckles 14 opposite left and right at the back of the handle 4 can be buckled to stabilize the product into a ladle shape, which is as shown in 15 of FIG. 7. Moreover, since the sizes of the folding slots at the upper and lower sides of the "V"-shaped second folding portion 16 are different (the upper side is deeper and the lower side is shallower), the folded head is easier to be folded upwards, so that the head will not turn over towards the back in a case that the ladle is fully filled with food or soup. According to the multi-functional ladle of the invention, the ladle can be conveniently and easily changed into the spatula, or the spatula can be conveniently and easily changed into the ladle utilizing the characteristics of the materials thereof and skillful design, which is convenient and practical.

According to the multi-functional ladle of the invention, the head of the multi-functional ladle can be opened to form the spatula through the "V"-shaped second folding portion of the connecting portion and the third folding portion as well as the match of the "W"-shaped first folding portion of the handle. Moreover, the handle can be folded into an arch, and the head can also be folded into an arch to form the ladle smoothly, so that the multi-functional ladle can be configured into a tool with two functions.

The above describes the technical solution provided by embodiments of the invention in details. Two specific examples are applied herein to clearly explain and illustrate the invention. However, the illustrations of the above implementation manners are only applied to help understand the principle and structure of the invention. Meanwhile, those having ordinary skills in the art may figure out other alternations and/or modifications based on the spirit and principle of the technical solution of the invention. It should be understood that all the modifications and/or transformations shall fall within the protection scope of the invention.

The invention claimed is:

1. A multi-functional ladle, comprising
a head made of a soft material;
a handle made of a hard material which comprises a first folding portion and is connected with the head;
wherein the head comprises a connecting portion to connect the head and the handle, and the connecting portion comprises a second folding portion and a third folding portion, by which the multi-functional ladle can be configured to be a spatula or a ladle;
wherein the second folding portion is V-shaped, and the bottom of the second folding portion and the third folding portion are configured to form an intersection point;
wherein the second folding portion comprises one or more first folding slots and one or more second folding slots, and the sizes of the first folding slot and the second folding slot are different.

2. The multi-functional ladle according to claim 1, wherein the maximum sizes of the first folding slot are 4.6 mm in depth and 5 mm in width; and the maximum sizes of the first folding slot are 1.4 mm in depth and 3 mm in width.

3. The multi-functional ladle according to claim 1, wherein the first folding portion of the handle is "W"-shaped.

4. The multi-functional ladle according to claim 3, wherein the middle of the "W"-shaped folding portion has a hollow part.

5. The multi-functional ladle according to claim 1, wherein the handle comprises two concave-convex buckles.

6. The multi-functional ladle according to claim 1, wherein the head bends in an upswept manner and keeps a height of 30-60 mm from the ground surface.

7. The multi-functional ladle according to claim 1, wherein the soft material is silicone or thermoplastic elastomer.

8. The multi-functional ladle according to claim 1, wherein the hard material is polyamide.

* * * * *